United States Patent
Vejlgaard et al.

(10) Patent No.: US 11,671,938 B2
(45) Date of Patent: Jun. 6, 2023

(54) DEVICE POSITIONING FOR MULTI-SIM USER EQUIPMENT

(71) Applicant: Nokia Technologies Oy, Espoo (FI)

(72) Inventors: Benny Vejlgaard, Gistrup (DK);
Johannes Harrebek, Aalborg (DK);
Ryan Keating, Chicago, IL (US);
Jürgen Hofmann, Merching (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/098,977

(22) Filed: Nov. 16, 2020

(65) Prior Publication Data

US 2022/0159612 A1    May 19, 2022

(51) Int. Cl.
*H04W 64/00* (2009.01)
*G01S 5/02* (2010.01)
(Continued)

(52) U.S. Cl.
CPC ......... *H04W 64/006* (2013.01); *G01S 5/0284* (2013.01); *H04W 4/025* (2013.01); *H04W 24/10* (2013.01)

(58) Field of Classification Search
CPC ............. H04M 3/4878; H04M 3/5191; H04M 3/5158; H04M 3/5175; H04M 3/42059;
(Continued)

(56) References Cited

U.S. PATENT DOCUMENTS

| 8,538,418 B2 | 9/2013 | Syrjarinne et al. |
| 8,755,836 B2 | 6/2014 | Shin |

(Continued)

FOREIGN PATENT DOCUMENTS

| WO | WO-2010/072240 A1 | 7/2010 |
| WO | 2019/220413 A1 | 11/2019 |

OTHER PUBLICATIONS

"3rd Generation Partnership Project; Technical Specification Group Radio Access Network; NR; Physical layer procedures for data (Release 16)", 3GPP TS 38.214, V16.1.0, Mar. 2020, pp. 1-151.
(Continued)

*Primary Examiner* — Kwasi Karikari
(74) *Attorney, Agent, or Firm* — Harness, Dickey & Pierce, P.L.C.

(57) ABSTRACT

A network element estimates a position of a user equipment served by a first network and a second network. At the network element, at least one memory and computer program code are configured to, with at least one processor, cause the network element to: determine first position measurement information for the user equipment in the first network; obtain position assistance data associated with the second network, the position assistance data including at least second position measurement information for the user equipment in the second network; obtain frequency offset information and time offset information for transmissions in the first network and transmissions in the second network; and estimate a position of the user equipment based on the first position measurement information, the second position measurement information, the frequency offset information and the time offset information.

20 Claims, 5 Drawing Sheets

(51) Int. Cl.
*H04W 4/02* (2018.01)
*H04W 24/10* (2009.01)

(58) Field of Classification Search
CPC .. H04M 3/51; H04M 3/493; H04M 2203/655; H04M 3/42102; H04M 3/42382; H04M 3/5235; H04W 4/80; H04W 4/029; H04W 4/12; H04W 12/121
See application file for complete search history.

(56) References Cited

U.S. PATENT DOCUMENTS

| | | | |
|---|---|---|---|
| 9,712,973 | B2 | 7/2017 | Shih et al. |
| 9,723,437 | B1 | 8/2017 | Bitra et al. |
| 2011/0039578 | A1 | 2/2011 | Rowitch et al. |
| 2015/0230112 | A1* | 8/2015 | Siomina ............ H04W 64/00 370/252 |
| 2016/0219648 | A1 | 7/2016 | Awoniyi-Oteri et al. |
| 2017/0280415 | A1* | 9/2017 | Kim .................. G01S 5/0236 |
| 2018/0242101 | A1 | 8/2018 | Lin et al. |
| 2018/0313929 | A1 | 11/2018 | Bitra et al. |
| 2018/0324815 | A1* | 11/2018 | Nammi ............. H04L 5/0057 |
| 2019/0053010 | A1 | 2/2019 | Edge et al. |

OTHER PUBLICATIONS

"3rd Generation Partnership Project; Technical Specification Group Radio Access Network; LTE Positioning Protocol (LPP) (Release 16)", 3GPP TS 37.355, V16.0.0, Mar. 2020, pp. 1-281.
"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.
"3rd Generation Partnership Project; Technical Specification Group Radio Access Network; NG-RAN; NR Positioning Protocol A (NRPPa) (Release 15)", 3GPP TS 38.455, V15.2.1, Jan. 2019, pp. 1-60.
"New WID: Support for Multi-SIM devices in Rel-17", 3GPP TSG RAN Meeting #86, RP-193263, Agenda: 9.1.2, Vivo, Dec. 9-12, 2019, 5 pages.
"New WID: NR Positioning Support", 3GPP TSG RAN Meeting #83, RP-190752, Agenda: 9.1.1, Intel Corporation, Mar. 18-21, 2019, 6 pages.
"Introduction of NR Positioning Support", 3GPP TSG-RAN WG1 Meeting #99, R1-1913661, Ericsson, Nov. 18-22, 2019, 11 pages.
"New SID on NR Positioning Enhancements", 3GPP TSG RAN Meeting #86, RP-193237, Qualcomm Incorporated, Dec. 9-12, 2019, 4 pages.
International Search Report and Written Opinion dated Jun. 10, 2022 issued in counterpart PCT application No. PCT/EP2021/081184.

* cited by examiner

DEVICE POSITIONING FOR MULTI-SIM USER EQUIPMENT

TECHNICAL FIELD

One or more example embodiments relate to wireless communications networks.

BACKGROUND

Fifth generation (5G) wireless communications networks are the next generation of mobile communications networks. Standards for 5G communications networks are currently being developed by the 3rd Generation Partnership Project (3GPP). These standards are known as 3GPP New Radio (NR) standards.

SUMMARY

The scope of protection sought for various example embodiments is set out by the independent claims. The example embodiments and/or features, if any, described in this specification that do not fall under the scope of the independent claims are to be interpreted as examples useful for understanding various embodiments.

According to one or more example embodiments, positioning information from at least two different networks are utilized to estimate the position of a user equipment (UE).

At least one example embodiment provides a network element to estimate a position of a user equipment served by a first network and a second network, the network element comprising at least one processor and at least one memory including computer program code. The at least one memory and the computer program code are configured to, with the at least one processor, cause the network element to: determine first position measurement information for the user equipment in the first network; obtain position assistance data associated with the second network, the position assistance data including at least second position measurement information for the user equipment in the second network; obtain frequency offset information and time offset information for transmissions in the first network and transmissions in the second network; and estimate a position of the user equipment based on the first position measurement information, the second position measurement information, the frequency offset information and the time offset information.

According to one or more example embodiments, the network element may be a location management function for the first network.

The position assistance data may include a location of at least one base station in the second network, and the at least one memory and the computer program code may be configured to, with the at least one processor, cause the network element to estimate the position of the user equipment based on the first position measurement information, the second position measurement information, the frequency offset information, the time offset information and the location of at least one base station in the second network.

The first position measurement information and the second position measurement information may include uplink time difference of arrival (UL-TDOA) information or uplink round trip time (UL-RTT) information.

The at least one memory and the computer program code may be configured to, with the at least one processor, cause the network element to receive a capability and connection report from the user equipment, the capability and connection report including (i) an indication that the user equipment is a multi-Subscriber Identify Module capable user equipment and (ii) a network identifier for the second network.

The at least one memory and the computer program code may be configured to, with the at least one processor, cause the network element to obtain the position assistance data from a location management function for the second network.

The at least one memory and the computer program code may be configured to, with the at least one processor, cause the network element to send a cross-network positioning request to a location management function for the second network, the cross-network positioning request requesting that the location management function for the second network configure the user equipment to generate the second position measurement information.

The cross-network positioning request may include a time at which to perform a positioning procedure to obtain the second position measurement information.

At least one example embodiment provides a method for estimating a position of a user equipment served by a first network and a second network, the method comprising: determining first position measurement information for the user equipment in the first network; obtaining position assistance data associated with the second network, the position assistance data including at least second position measurement information for the user equipment in the second network; obtaining frequency offset information and time offset information for transmissions in the first network and transmissions in the second network; and estimating a position of the user equipment based on the first position measurement information, the second position measurement information, the frequency offset information and the time offset information.

At least one other example embodiment provides a non-transitory computer readable storage medium storing computer readable instructions that, when executed by at least one processor at a network element, cause the network element to perform a method for estimating a position of a user equipment served by a first network and a second network, the method comprising: determining first position measurement information for the user equipment in the first network; obtaining position assistance data associated with the second network, the position assistance data including at least second position measurement information for the user equipment in the second network; obtaining frequency offset information and time offset information for transmissions in the first network and transmissions in the second network; and estimating a position of the user equipment based on the first position measurement information, the second position measurement information, the frequency offset information and the time offset information.

The position assistance data may include a location of at least one base station in the second network, and the estimating may estimate the position of the user equipment based on the first position measurement information, the second position measurement information, the frequency offset information, the time offset information and the location of at least one base station in the second network.

The first position measurement information and the second position measurement information may include uplink time difference of arrival (UL-TDOA) information or uplink round trip time (UL-RTT) information.

The method may further include: receiving a capability and connection report from the user equipment, the capability and connection report including (i) an indication that the user equipment is a multi-Subscriber Identify Module capable user equipment and (ii) a network identifier for the second network.

The method may further include obtaining the position assistance data from a location management function for the second network.

The method may further include sending a cross-network positioning request to a location management function for the second network, the cross-network positioning request requesting that the location management function for the second network configure the user equipment to generate the second position measurement information.

The cross-network positioning request may include a time at which to perform a positioning procedure to obtain the second position measurement information.

At least one other example embodiment provides a network element to estimate a position of a user equipment served by a first network and a second network, the network element comprising: means for determining first position measurement information for the user equipment in the first network; means for obtaining position assistance data associated with the second network, the position assistance data including at least second position measurement information for the user equipment in the second network; means for obtaining frequency offset information and time offset information for transmissions in the first network and transmissions in the second network; and means for estimating a position of the user equipment based on the first position measurement information, the second position measurement information, the frequency offset information and the time offset information.

At least one other example embodiment provides a network element to estimate a position of a user equipment served by a first network and a second network, the network element comprising at least one processor and at least one memory including computer program code. The at least one memory and the computer program code are configured to, with the at least one processor, cause the network element to: generate first enhanced cell identification information for the user equipment in the first network, obtain second enhanced cell identification information for the user equipment in the second network, and estimate a position of the user equipment based on the first enhanced cell identification information and the second enhanced cell identification information.

The at least one memory and the computer program code may be configured to, with the at least one processor, cause the network element to estimate the position of the user equipment by combining the first enhanced cell identification information and the second enhanced cell identification information.

The at least one memory and the computer program code may be configured to, with the at least one processor, cause the network element to obtain the second enhanced cell identification information from a location management function for the second network.

At least one other example embodiment provides a method for estimating a position of a user equipment served by a first network and a second network, the method comprising: generating first enhanced cell identification information for the user equipment in the first network; obtaining second enhanced cell identification information for the user equipment in the second network; and estimating a position of the user equipment based on the first enhanced cell identification information and the second enhanced cell identification information.

At least one other example embodiment provides a network element to estimate a position of a user equipment served by a first network and a second network, the network element comprising: means for generating first enhanced cell identification information for the user equipment in the first network; means for obtaining second enhanced cell identification information for the user equipment in the second network; and means for estimating a position of the user equipment based on the first enhanced cell identification information and the second enhanced cell identification information.

At least one other example embodiment provides a non-transitory computer readable storage medium storing computer readable instructions that, when executed by at least one processor at a network element, cause the network element to perform a method for estimating a position of a user equipment served by a first network and a second network, the method comprising: generating first enhanced cell identification information for the user equipment in the first network; obtaining second enhanced cell identification information for the user equipment in the second network; and estimating a position of the user equipment based on the first enhanced cell identification information and the second enhanced cell identification information.

At least one other example embodiment provides a user equipment in communication with a first serving base station in a first network and a second serving base station in a second network, the user equipment comprising at least one processor and at least one memory including computer program code. The at least one memory and the computer program code are configured to, with the at least one processor, cause the user equipment to: send a first capability and connection report to the first network, the first capability and connection report indicating (i) a multi-Subscriber Identify Module (SIM) capability for the user equipment and (ii) a network identifier for the second network; send a second capability and connection report to the second network, the second capability and connection report indicating (i) the multi-Subscriber Identify Module capability for the user equipment and (ii) a network identifier for the first network; and report time offset information and frequency offset information to the first network for estimating a position of the user equipment, the time offset information indicative of a time offset between transmissions in the first network and transmissions in the second network, and the frequency offset information indicative of a frequency offset between transmissions in the first network and transmissions in the second network.

The at least one memory and the computer program code may be configured to, with the at least one processor, cause the user equipment to: send the first capability and connection report to a first location management function for the first network, and send the second capability and connection report to a second location management function for the second network.

At least one other example embodiment provides a method of operating a user equipment in communication with a first serving base station in a first network and a second serving base station in a second network, the method comprising: sending a first capability and connection report to the first network, the first capability and connection report indicating (i) a multi-Subscriber Identify Module (SIM) capability for the user equipment and (ii) a network identifier for the second network; sending a second capability and connection report to the second network, the second capability and connection report indicating (i) the multi-Subscriber Identify Module capability for the user equipment and (ii) a network identifier for the first network; and reporting time offset information and frequency offset information to the first network for estimating a position of the user equipment, the time offset information indicative of a time offset between transmissions in the first network and transmissions in the second network, and the frequency offset information indicative of a frequency offset between transmissions in the first network and transmissions in the second network.

At least one other example embodiment provides a non-transitory computer readable storage medium storing computer readable instructions that, when executed by at least one processor at a user equipment, cause the user equipment to perform a method of operating a user equipment in communication with a first serving base station in a first network and a second serving base station in a second network, the method comprising: sending a first capability and connection report to the first network, the first capability and connection report indicating (i) a multi-Subscriber Identify Module (SIM) capability for the user equipment and (ii) a network identifier for the second network; sending a second capability and connection report to the second network, the second capability and connection report indicating (i) the multi-Subscriber Identify Module capability for the user equipment and (ii) a network identifier for the first network; and reporting time offset information and frequency offset information to the first network for estimating a position of the user equipment, the time offset information indicative of a time offset between transmissions in the first network and transmissions in the second network, and the frequency offset information indicative of a frequency offset between transmissions in the first network and transmissions in the second network.

At least one other example embodiment provides a user equipment in communication with a first serving base station in a first network and a second serving base station in a second network, the user equipment comprising: means for sending a first capability and connection report to the first network, the first capability and connection report indicating (i) a multi-Subscriber Identify Module (SIM) capability for the user equipment and (ii) a network identifier for the second network; means for sending a second capability and connection report to the second network, the second capability and connection report indicating (i) the multi-Subscriber Identify Module capability for the user equipment and (ii) a network identifier for the first network; and means for reporting time offset information and frequency offset information to the first network for estimating a position of the user equipment, the time offset information indicative of a time offset between transmissions in the first network and transmissions in the second network, and the frequency offset information indicative of a frequency offset between transmissions in the first network and transmissions in the second network.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

Figure 1:
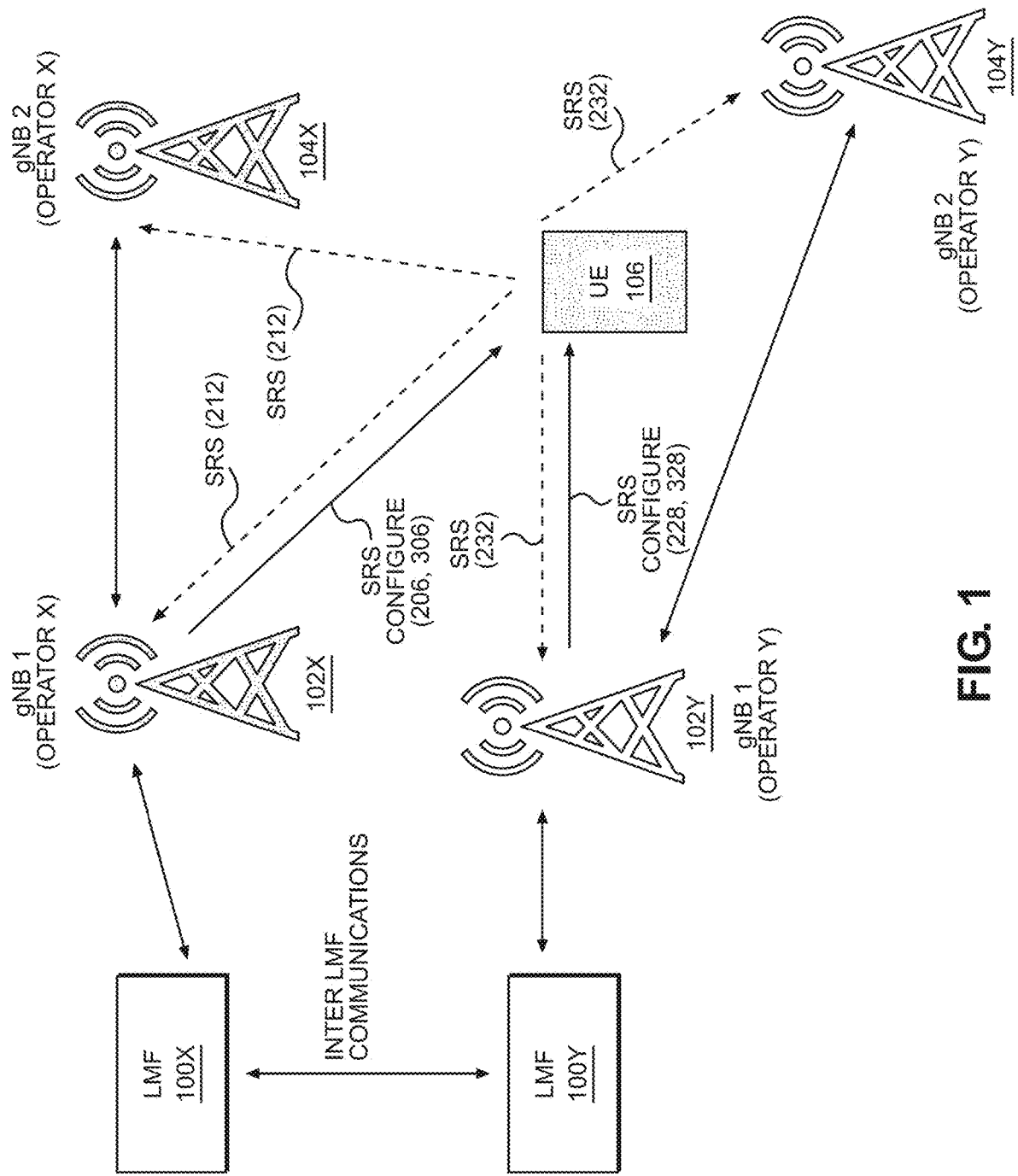
FIG. 1 illustrates a simplified diagram of a portion of a 3rd Generation Partnership Project (3GPP) New Radio (NR) access deployment for explaining example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of radio access network (RAN) or radio network elements (e.g., a gNB), user equipment (UE), or the like, it should be understood that one or more example embodiments discussed herein may be performed by one or more processors (or processing circuitry) at the applicable device. For example, according to one or more example embodiments, at least one memory may include or store computer program code, and the at least one memory and the computer program code may be configured to, with at least one processor, cause a radio network element (or user equipment) to perform the operations discussed herein.

As discussed herein, the terminology "one or more" and "at least one" may be used interchangeably.

As discussed herein, a gNB may also be referred to as a base station, access point, enhanced NodeB (eNodeB), or more generally, a radio access network element, radio network element, or network node. A UE may also be referred to herein as a mobile station, and may include a mobile phone, a cell phone, a smartphone, a handset, a personal digital assistant (PDA), a tablet, a laptop computer, a phablet, or the like.

It will be appreciated that a number of example embodiments may be used in combination.

A multi-Subscriber Identify Module (MSIM) device is capable of multiple simultaneous or concurrent network (e.g., $3^{rd}$ Generation Partnership Project (3GPP) network)

connections and multiple International Mobile Equipment Identities (IMEIs) each associated with a particular SIM. Thus, a multi-SIM device may be served simultaneously or concurrently by separate networks. MSIM devices manage the connections on the device side without network involvement. To this end, the MSIM device selects which service can run using which SIM. Each SIM may support different type of subscription and service quality Multi UE SIM (multi-USIM) devices have been increasingly popular in different countries. In a multi-USIM device, a user may have both a personal and a business subscription in one device or may have two personal subscriptions in one device for different services (e.g., an individual subscription and a "family" plan). However, support for multi-USIM within a device is currently handled in an implementation-specific manner without any support from 3GPP specifications, which results in a variety of implementations and UE behaviors. Standardizing support for such UE's may be beneficial from a performance perspective in that network functionality may be based on more predictable behavior at the UE.

A UE, such as multi-USIM UE, which is registered to more than one network must be able to receive pages from more than one network. Depending on UE capabilities (e.g., receive (Rx) and transmit (Tx) capabilities), this can create situations in which a UE is occupied listening to pages from one network while pages from other networks also may be sent. Further, UEs may be actively communicating with one network while another network attempts to page the UE. If a UE switches between communications from a first network to a different second network, situations may occur in which the UE is no longer able to receive data from the first network. Such situations can have a negative impact on performance (e.g., if pages are sent and not properly received, or if UEs are scheduled in a network while not being able to communicate in that network).

With regard positioning, a 3GPP NR Release 16 (Rel-16) work item was conducted in 3GPP for native positioning support in 3GPP NR. As the result of that work, the following positioning solutions are specified for 3GPP NR Rel-16:

Downlink Time Difference of Arrival (DL-TDOA)
Uplink Time Difference of Arrival (UL-TDOA)
Downlink Angle of Departure (DL-AoD)
Uplink Angle of Arrival (UL-AoA)
Multi-cell Round Trip Time (Multi-RTT)

Further, the work involved in specifying solutions to enable RAT dependent (for both FR1 and FR2) and RAT independent NR positioning techniques. On the downlink (DL), a new positioning reference signal (PRS) was introduced. On the uplink (UL), a new sounding reference signal (SRS) for positioning (SRS-P) was introduced. Rel-16 also introduced UE-based positioning for downlink techniques (e.g., DL-TDOA), which resulted in the UE making both the positioning measurements and the location estimate locally at the UE. In the UE-based mode, the location of the gNBs is sent to the UE for use in the location estimation process.

In 3GPP NR Release 17 (Rel-17), further work on positioning is expected with the main target being to study enhancements and solutions necessary to support the relatively high accuracy (horizontal and vertical), relatively low latency, network efficiency (e.g., scalability, reference signal (RS) overhead, etc.), and device efficiency (e.g., power consumption, complexity, etc.) requirements for commercial use cases, including general commercial use cases and specifically Internet-of-Things (IoT) use cases.

With regard to emergency wireless services, the Federal Communications Commission's (FCC) wireless Enhanced 911 (E911) rules seek to improve the effectiveness and reliability of wireless 911 services by providing 911 dispatchers with additional information on wireless 911 calls. The FCC's wireless E911 rules apply to all wireless licensees, broadband Personal Communications Service (PCS) licensees, and certain Specialized Mobile Radio (SMR) licensees.

The FCC has divided the wireless E911 program into Phase I and Phase II.

Under Phase I, the FCC requires carriers, within six months of a valid request by a local Public Safety Answering Point (PSAP), to provide the PSAP with the telephone number of the originator of a wireless 911 call and the location of the cell site or base station transmitting the call.

Under Phase II, the FCC requires wireless carriers, within six months of a valid request by a PSAP, to begin providing information that is more precise to PSAPs, specifically, the latitude and longitude of the caller. This information must meet FCC accuracy standards, generally to within 50 to 300 meters, depending on the type of technology used. The deployment of E911 requires the development of new technologies and upgrades to local 911 PSAPs, as well as coordination among public safety agencies, wireless carriers, technology vendors, equipment manufacturers, and local wireline carriers.

Currently, positioning in 3GPP NR networks relies on AoA and TDOA or RTT, each of which require at least three or four visible gNBs for triangulating the position of a UE. RTT is computed by combining a UE receive-transmit (Rx-Tx) time difference measurement by the UE and a gNB Rx-Tx time difference measurement by the gNB.

For non-line of sight (non-LoS) environments, even more gNBs are needed to provide accurate positioning estimates. However, in rural areas and indoor (no Global Navigation Satellite System (GNSS) connections), the availability of three or more gNBs may be difficult to obtain. Moreover, even when three or more base stations are visible, sufficient accuracy may be difficult to attain, especially for non-LoS scenarios.

One or more example embodiments provide mechanisms to improve positioning accuracy for UEs in a 3GPP NR network. For example, one or more example embodiments provide mechanisms for estimating a position of a UE when less than 3 or 4 gNBs in a single network are visible. One or more example embodiments also provide mechanisms for increasing positioning accuracy for a UE in non-LoS conditions.

In more detail, for example, one or more example embodiments propose a set of procedures to enable uplink or network-based positioning using gNBs from multiple networks to obtain a larger number of gNBs for triangulating the position of a UE. Example embodiments focus primarily on uplink or network-based positioning methods, however, example embodiments should not be limited to the example embodiments discussed herein.

By virtue of one or more example embodiments, a network may utilize more visible gNBs (that were otherwise not available) and/or may increase the number of gNBs even further to obtain more accurate position estimates for UEs. The positioning techniques for which example embodiments apply may include UL-TDOA, multi-RTT and/or Enhanced Cell ID (E-CID). However, example embodiments should not be limited to these examples. Rather, example embodiments may be applicable to any positioning technique involving uplink transmissions.

FIG. 1 illustrates a simplified diagram of a portion of a 3GPP NR access deployment for explaining example embodiments in more detail. The diagram shown in FIG. 1 also includes some embedded signaling to assist in explaining example embodiments. This embedded signaling will be discussed later with regard to FIGS. 2 and 3.

Referring to FIG. 1, the 3GPP NR radio access deployment includes separate networks X and Y. Network X (also referred to as first network X) includes gNBs 102X and 104X providing cellular resources for UEs (e.g., UE 106) within a first geographical coverage area. Network Y (also referred to as second network Y) includes gNBs 102Y and 104Y providing cellular resources for UEs (e.g., UE 106) within a second geographical coverage area. The first and second geographical coverage areas may overlap. Moreover, networks X and Y may employ the same or different radio access technologies and/or be deployed by the same or different network providers.

Although not shown, each gNB in FIG. 1 may have transmission and reception points (TRPs), wherein each TRP may be, for example, a remote radio head (RRH) or remote radio unit (RRU) including at least, for example, a radio frequency (RF) antenna (or antennas) or antenna panels, and a radio transceiver, for transmitting and receiving data within a geographical area. In some cases, baseband processing may be divided between the TRPs and the gNB in a 5th Generation (5G) cell. Alternatively, the baseband processing may be performed at the gNB. In the example shown in FIG. 1, the gNBs are configured to communicate with UEs via one or more transmit (Tx)/receive (Rx) beam pairs. The gNBs also communicate with the core network, which is referred to as the New Core in 3GPP NR and includes, among other things, location management functions (LMFs) 100X and 100Y for networks X and Y, respectively. According to one or more example embodiments, LMF 100X and 100Y are in two-way communication with each other as well as their respective RAN elements (e.g., gNBs) and UEs within the respective networks.

According to one or more example embodiments, the LMF 100X and LMF 100Y may communicate utilizing an extension of Long Term Evolution (LTE) Positioning Protocol (LPP), which allows the LMF 100X and LMF 100Y to exchange messages using the UE 106 as a relay. In another example embodiment, the LMF 100X and the LMF 100Y may communicate using IP layer signaling between the LMFs. Although example embodiments are discussed herein with regard to an extension of LPP and IP layer signaling, example embodiments should not be limited to these examples. Because details of LPP and IP layer signaling are generally known, a detailed discussion is omitted.

In addition to the specific functionality discussed herein, a LMF is a network entity supporting functionality including: location determination for a UE, obtaining downlink location measurements or location estimates from the UE, obtaining uplink location measurements from the radio access network (RAN, such as a NG RAN), and obtaining non-UE associated assistance data from the RAN.

In the access deployment shown in FIG. 1, gNB 102X is a serving gNB for UE 106 in network X, whereas gNB 104X is a neighbor gNB in network X. Similarly, gNB 102Y is a serving gNB for UE 106 in network Y, whereas gNB 104Y is a neighbor gNB in network Y. LMF 100X is the location management function for network X and LMF 100Y is the location management function for network Y. As mentioned above, each of LMF 100X and LMF 100Y are located in the core network.

Although only two networks are shown in FIG. 1, example embodiments should not be limited this example. Moreover, although each network is shown as including only two gNBs for simplicity, example embodiments should not be limited to this example. Rather, as is known, a RAN may have any number of gNBs deployed across a geographical area.

The UE 106 is a multi-USIM UE configured to communicate via multiple networks, in this case networks X and Y. Although only a single UE 106 is shown in FIG. 1, network X and network Y may each provide communication services to a relatively large number of UEs within the geographical coverage area of each network. For the sake of clarity of example embodiments, communication services (including transmitting and receiving wireless signals) will be discussed as between the LMFs, gNBs and UEs. It should be understood, however, that signals may be transmitted between the UE and one or more of the TRPs (not shown).

As mentioned above, one or more example embodiments propose a set of procedures to enable uplink or network-based positioning using gNBs from multiple networks to obtain a larger number of gNBs for triangulating the position of a UE. Example embodiments focus primarily on uplink or network-based positioning methods, however, example embodiments should not be limited to the example embodiments discussed herein.

Although not shown explicitly in the figures, the position determination according to one or more example embodiments may be triggered by one or more position determination trigger events. According to one or more example embodiments, trigger events may include E911 service request, a network initiated event, a user application initiated event at the UE, etc. The position determination may also be performed periodically.

Figure 2:
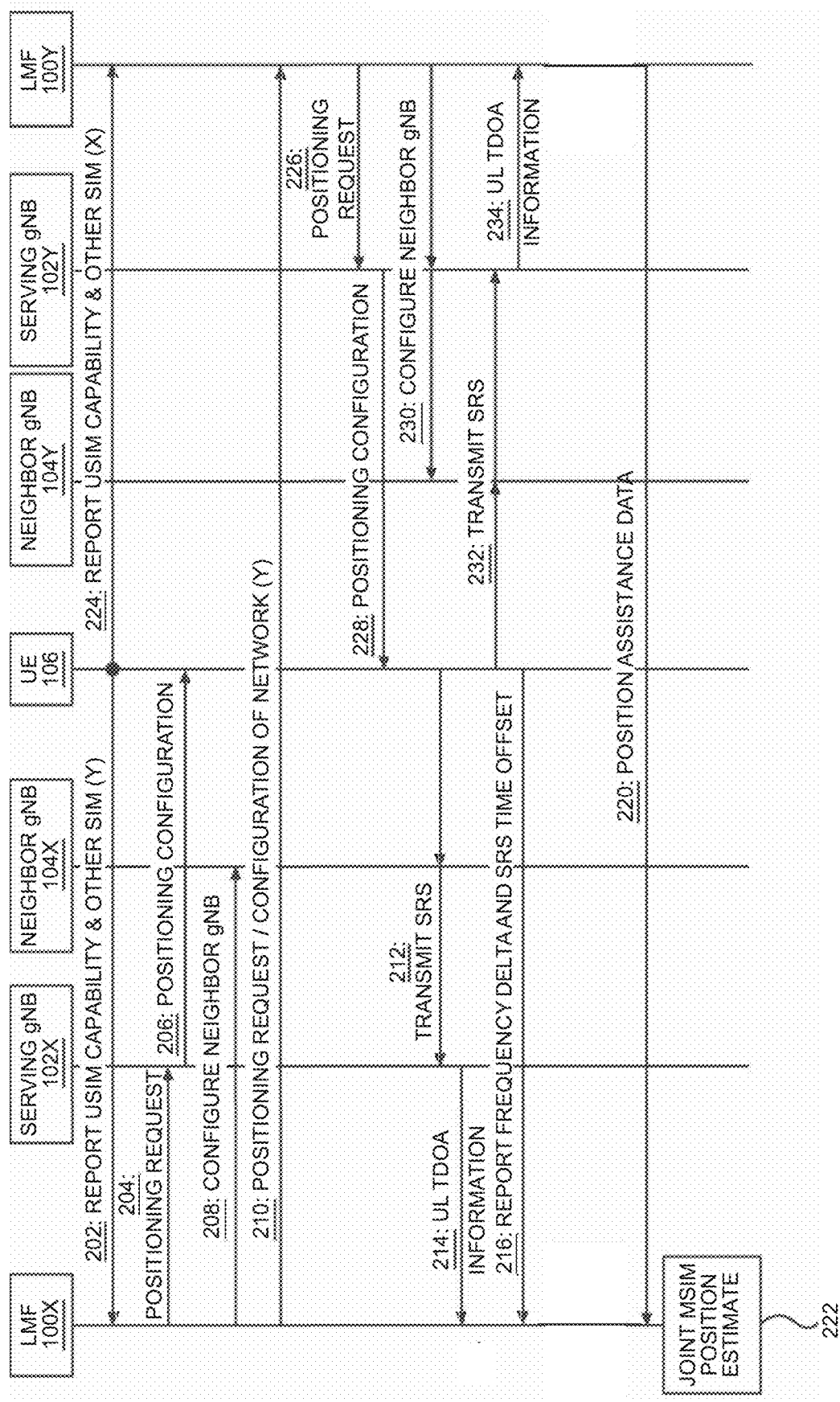
FIG. 2 is a signal flow diagram illustrating a method according to example embodiments.

FIG. 2 is a signal flow diagram illustrating a method for multi-SIM uplink positioning using UL-TDOA according to example embodiments. The example embodiment shown in FIG. 2 will be discussed with regard to the access deployment shown in FIG. 1 for example purposes. However, example embodiments should not be limited to this example.

Referring to FIG. 2, at 202 the UE 106 reports, to LMF 100X, that the UE 106 has multi-USIM capability and is connected to network Y. In at least one example embodiment, the UE 106 may indicate the connection to network Y by reporting the network identifier (ID) of network Y to the LMF 100X. Also at 202, the UE 106 may report, to LMF 100X, the positioning methods (e.g., TDOA, RTT, E-CID, etc.) supported by network Y. In at least some instances, the report from the UE 106 at 202 may be referred to herein as a (first) capability and connection report. The UE 106 may send the capability and connection report using, for example, LPP signaling between the LMF 100X and the UE 106 in network X.

At 224, the UE 106 reports, to LMF 100Y, that the UE 106 has multi-USIM capability and is connected to network X. In at least one example embodiment, the UE 106 may indicate the connection to network X by reporting the network ID of network X to LMF 100Y. The UE 106 may also report, to LMF 100Y, the positioning methods (e.g., UL-TDOA, UL-RTT, E-CID, etc.) supported by network X. In at least some instances, the report from the UE 106 at 224 may be referred to herein as a (second) capability and connection report. The UE 106 may send this capability and connection report using, for example, LPP signaling between the LMF 100Y and the UE 106 in network Y. Steps 202 and 224 may occur concurrently, simultaneously or serially.

As a result of 202, network X is aware of the UE 106 being connected to network Y, and of the network ID of network Y. As a result of 224, network Y is aware of the UE 106 being connected to network X, and of the network ID of network X.

Although not shown in FIG. 2, but illustrated in FIG. 1, in at least some example embodiments, the LMFs 100X and 100Y may exchange capability information to determine the positioning methods supported by each respective network (e.g., in response to receiving the LPP signaling reporting the network ID of the other network) if this information is not reported by the UE 106 at 202 or 224.

Still referring to FIG. 2, with regard to network X, in response to the first capability and connection report from the UE 106, at 204 the LMF 100X sends a positioning request to the serving gNB 102X. The positioning request requests connection to the UE 106 via the serving gNB 102X, and a position of the UE 106 using UL-TDOA via the serving gNB 102X.

At 206, the serving gNB 102X configures the UE 106 for uplink sounding reference signal (SRS) transmission in network X. In one example, the serving gNB 102X configures and/or assigns an uplink SRS sequence as well as time and frequency (physical) resources for the uplink SRS transmission by the UE 106 to the serving gNB 102X and the neighbor gNB 104X.

At 208, the serving gNB 102X configures the neighbor gNB 104X to receive the uplink SRS transmissions from the UE 106. In one example, the serving gNB 102X configures and/or assigns, at the neighbor gNB 104X, the uplink SRS sequence as well as time and frequency (physical) resources for uplink SRS transmission by the UE 106 such that the neighbor gNB 104X is able to receive the uplink SRS transmissions from the UE 106. The configuration of the neighbor gNB 104X corresponds to the configuration of the UE 106.

At 210, the LMF 100X requests that the LMF 100Y configure the UE 106 for performing a positioning procedure (e.g., UL-TDOA, UL-RTT, E-CID, etc.) in network Y. According to at least one example embodiment, the request from the LMF 100X may include a time for the positioning procedure to occur (e.g., so that the uplink SRS transmissions from the UE 106 in network Y are sent relatively close in time to when the uplink SRS transmissions are sent to the UE 106 in network X). The request may also include a UE ID for the UE 106, and the positioning method (e.g., UL-TDOA, UL-RTT, E-CID, etc.). In this example, the positioning method is UL-TDOA. The request sent from the LMF 100X to the LMF 100Y may be referred to herein as a cross-network positioning request.

In at least one example embodiment, the LMF 100X may send the cross-network positioning request to the LMF 100Y utilizing the above-discussed extension of LPP, using IP layer signaling between the LMFs, or the like. However, example embodiments should not be limited to this example.

At 212, the UE 106 sends the uplink SRS transmissions by transmitting the configured uplink SRS sequence on the assigned physical resources (e.g., frequency and time resources) to the serving gNB 102X and the neighbor gNB 104X in network X.

At 214, the serving gNB 102X provides UL-TDOA information to the LMF 100X in response to the uplink SRS transmission from the UE 106. The UL-TDOA information may include the observed or measured time of arrival (e.g., a receipt time stamp) for the uplink SRS transmission from the UE 106 at the serving gNB 102X and the neighbor gNB 104X (reported to the serving gNB 102X).

Turning to network Y, in response to the cross-network positioning request from the LMF 100X (at 210), at 226 the LMF 100Y sends a positioning request to the serving gNB 102Y in network Y. The position request requests connection to the UE 106 via the serving gNB 102Y, and a position of the UE 106 using UL-TDOA via the serving gNB 102Y.

According to at least one example embodiment, the positioning request from the LMF 100Y may be the same or substantially the same as the positioning request from LMF 100X discussed above with regard to 204.

At 228, the serving gNB 102Y configures the UE 106 for uplink SRS transmission in network Y. In one example, the serving gNB 102Y configures and/or assigns an uplink SRS sequence as well as time and frequency (physical) resources for the uplink SRS transmission by the UE 106 to the serving gNB 102Y and the neighbor gNB 104Y in network Y.

At 230, the serving gNB 102Y configures neighbor gNB 104Y to receive the uplink SRS transmissions from the UE 106 in network Y. In one example, the serving gNB 102Y configures and/or assigns, at the neighbor gNB 104Y, the uplink SRS sequence as well as time and frequency (physical) resources for uplink SRS transmission by the UE 106 such that the neighbor gNB 104Y is able to receive the uplink SRS transmissions from the UE 106 in network Y. The configuration of the neighbor gNB 104Y corresponds to the configuration of the UE 106 at 228.

At 232, the UE 106 sends the uplink SRS transmissions in network Y by transmitting the configured uplink SRS sequence on the assigned physical resources (e.g., frequency and time resources) to the serving gNB 102Y and the neighbor gNB 104Y.

At 234, the serving gNB 102Y provides UL-TDOA information to the LMF 100Y in response to the uplink SRS transmission from the UE 106. The UL-TDOA information may include the observed or measured time of arrival (e.g., a receipt time stamp) for the uplink SRS transmission from the UE 106 at the serving gNB 102Y and the neighbor gNB 104Y (reported to the serving gNB 102Y).

As mentioned above, the cross-network positioning request at 210 includes a time for the positioning procedure to occur in network Y such that the uplink SRS transmissions from the UE 106 in network Y occur relatively close in time to the similar uplink SRS transmissions in network X. Accordingly, 212 and 232 in FIG. 2 may occur at the same or substantially the same time.

Returning to network X, at 216 the UE 106 provides time and frequency offset information to the LMF 100X. The time and frequency offset information may include time offset for the SRS transmission in network X (at 212) and network Y (at 232) and frequency offset between network X and network Y. In at least one example embodiment, the time offset and the frequency offset between network X and network Y may be estimated based on the downlink reference symbol/signal transmission from the serving gNB 102X and the neighbor gNB 104X in network X and from the serving gNB 102Y and the neighbor gNB 104Y in network Y. The UE 106 may compute the time and frequency offset between network X and network Y in any suitable manner. The UE 106 may report the frequency offset (delta) and time offset information to the LMF 100X using LPP signaling.

At 220, the LMF 100Y sends position assistance data for the UE 106 in network Y to the LMF 100X. According to one or more example embodiments, the position assistance data may include locations of gNBs 102Y and 104Y in network Y as well as the UL-TDOA information provided at 234.

At 222, the LMF 100X jointly estimates the position of the UE 106 based on the UL-TDOA information in network X, the UL-TDOA information from network Y, and the frequency and time offset information provided by the UE 106 at 216.

According to one or more example embodiments, UL-TDOA uses time of arrival (ToA) measurements (receipt time stamps and receipt frequency) and the location of the gNBs to estimate the position of the UE. In at least one example embodiment, the LMF 100X utilizes measurements from both network X and Y to increase the number of ToA measurements to compute the position of the UE 106. The measurements from network Y may have error if used directly by LMF 100X. To compensate for this error, the LMF 100X utilizes the time and frequency offset information from the UE 106 to adjust the ToA measurement from network X and network Y as having the same reference such that the measurements may be used in a joint position estimation.

In more detail, for example, at 222, the LMF 100X may compensate for the offset between the ToA measurements (time and frequency) in respective networks X and Y by subtracting the time and frequency offset from the ToA measurements in network X or network Y. The ToA measurements may then be combined, and the combined measurements used to estimate the position of the UE 106 according to the known UL-TDOA calculation methodology, which takes into account the positions of gNBs 102X, 102Y, 104X and 104Y in determining the position of the UE 106. In one example, the combination of measurements may be a weighted average.

According to at least one example embodiment, if the UL-TDOA information from each of network X and network Y includes measurements from at least three gNBs, then the LMF 100X may estimate the position of the UE 106 in each network separately, and combine the position estimates to generate a joint estimate of the position of the UE 106. In this example, the combination may be an average of the estimated positions of the UE 106 in each network.

Figure 3:
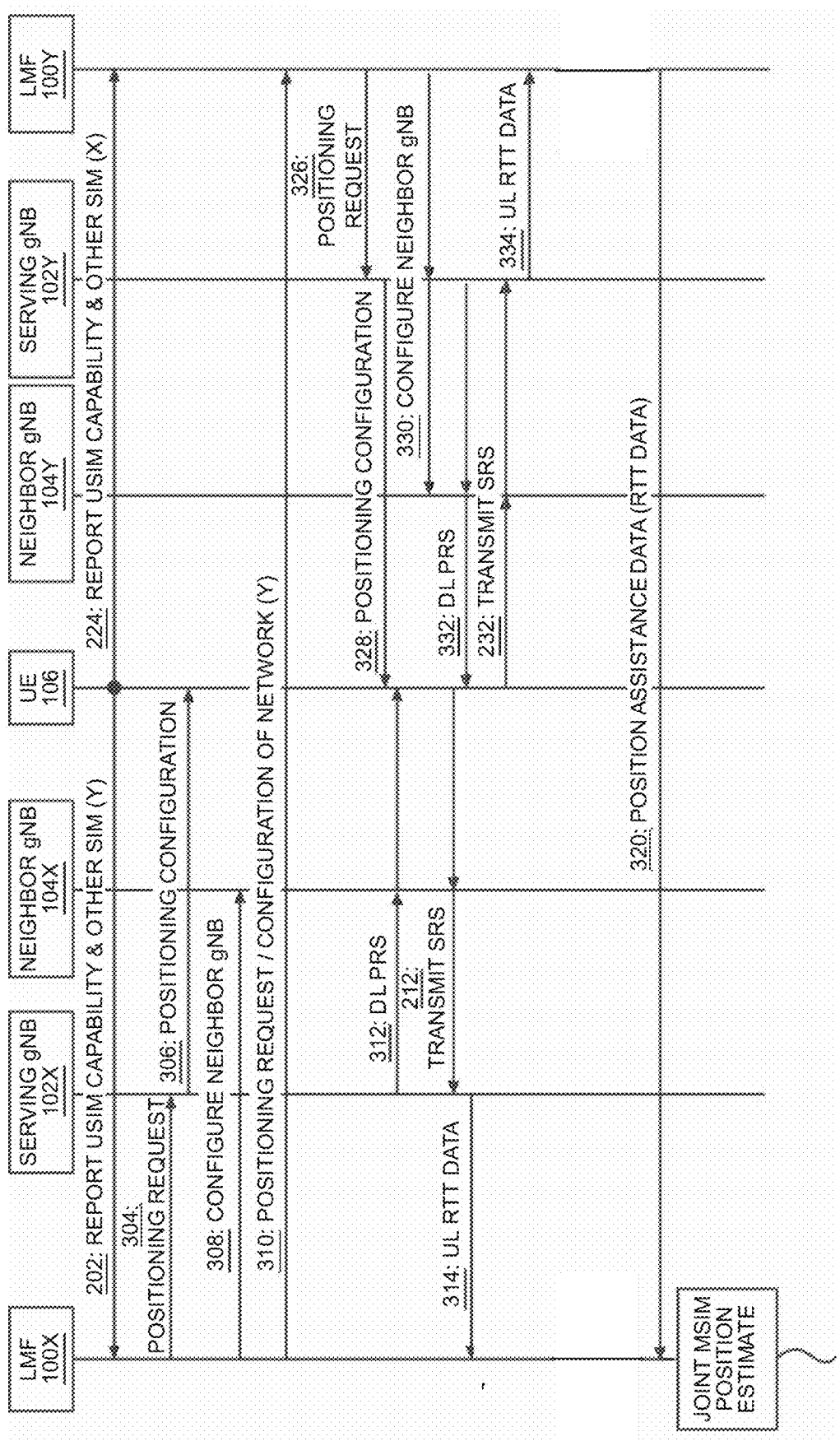
FIG. 3 is a signal flow diagram illustrating another method according to example embodiments.

FIG. 3 is a signal flow diagram illustrating a method for multi-SIM uplink positioning using UL-RTT according to example embodiments. The example embodiment shown in FIG. 3 will be discussed with regard to the access deployment shown in FIG. 1 for example purposes. However, example embodiments should not be limited to this example. In FIG. 3, the operations that are the same as those in FIG. 2 are identified with the same reference character.

Referring to FIG. 3, at 202 the UE 106 reports, to LMF 100X, that the UE 106 has multi-USIM capability and is connected to network Y in the same or substantially the same manner as discussed above with regard to FIG. 2 (first capability and connection report).

At 224, the UE 106 reports, to LMF 100Y, that the UE 106 has multi-USIM capability and is connected to network X in the same or substantially the same manner as discussed above with regard to FIG. 2 (second capability and connection report).

As a result of 202, network X is aware of the UE 106 being connected to network Y, and of the network ID of network Y. As a result of 224, network Y is aware of the UE 106 being connected to network X, and of the network ID of network X.

Although not shown in FIG. 3, but illustrated in FIG. 1, in at least some example embodiments, the LMFs 100X and 100Y may exchange capability information to determine the positioning methods supported by each respective network (e.g., in response to receiving the LPP signaling reporting the network ID of the other network) if this information is not reported by the UE 106 at 202 or 224 in FIG. 3.

Still referring to FIG. 3, with regard to network X, in response to the first capability and connection report from the UE 106, at 304 the LMF 100X sends a positioning request to the serving gNB 102X. The positioning request requests a connection to the UE 106 via the serving gNB 102X, and a position of the UE 106 using UL-RTT with regard to the serving gNB 102X. In at least one example embodiment, the UL-RTT positioning request may be similar to the UL-TDOA positioning request discussed above with regard to FIG. 2, except that the positioning request requests a position of the UE 106 using UL-RTT.

At 306, the serving gNB 102X configures the UE 106 for UL-RTT reception and transmission. In more detail, for example, the serving gNB 102X configures and/or assigns an uplink SRS sequence, a downlink PRS sequence, and physical (e.g., time and frequency) resources for uplink SRS transmission and the downlink PRS reception, and time offset (delta) reporting for the uplink SRS transmission and downlink PRS reception by the UE 106 to the serving gNB 102X and the neighbor gNB 104X.

At 308, the serving gNB 102X configures the neighbor gNB 104X to transmit downlink PRS to the UE 106, and to receive uplink SRS from the UE 106. In more detail, for example, the serving gNB 102X configures and/or assigns, to the neighbor gNB 104X, uplink SRS sequence, and physical (e.g., time and frequency) resources for the reference signal transmission and reception to and from the UE 106.

At 310, the LMF 100X requests that LMF 100Y configure the UE 106 for a positioning procedure (e.g., UL-RTT) in network Y. According to at least one example embodiment, the request from the LMF 100X may include a time for the positioning procedure to occur (e.g., so that the reference signal transmissions in network Y occur relatively close in time to when the reference signal transmissions occur in network X). The request may also include a UE ID for the UE 106, and the positioning method (e.g., UL-RTT). In this example, the positioning request method is UL-RTT. As with FIG. 2, the request sent from the LMF 100X to the LMF 100Y may be referred to here as a cross-network positioning request.

In at least one example embodiment, the LMF 100X may send the cross-network positioning request to the LMF 100Y utilizing the above-discussed extension of LPP, using IP layer signaling between the LMFs, or the like. However, example embodiments should not be limited to this example.

At 312, the serving gNB 102X and the neighbor gNB 104X transmit the downlink PRS to the UE 106 utilizing the configured/assigned resources.

At 212, the UE 106 sends the uplink SRS transmissions by transmitting the configured uplink SRS sequence on the assigned physical resources (e.g., frequency and time resources) to the serving gNB 102X and the neighbor gNB 104X in network X.

At 314, the serving gNB 102X reports UL-RTT data to the LMF 100X. The UL-RTT data may include SRS information (e.g., SRS sequence and transmit and receive time (Tx-Rx time)) for the uplink and downlink reference signals (e.g., uplink SRS and downlink PRS) from and to the UE 106.

Turning to network Y, in response to the cross-network positioning request from the LMF 100X (at 310), at 326 the LMF 100Y sends a positioning request to the serving gNB 102Y in network Y. The positioning request requests a connection to the UE 106 via the serving gNB 102Y, and a position of the UE 106 using UL-RTT with regard to the serving gNB 102Y. The positioning request may be the same as the positioning request discussed above with regard to 304, but with regard to network Y.

At 328, the serving gNB 102Y configures the UE 106 for UL-RTT reception and transmission in network Y. In more detail, for example, the serving gNB 102Y configures and/or assigns an uplink SRS sequence, a downlink PRS sequence, and physical (e.g., time and frequency) resources for uplink SRS transmission and downlink PRS reception, and time offset (delta) reporting for the uplink SRS transmission and the downlink PRS reception by the UE 106 to the serving gNB 102Y and the neighbor gNB 104Y.

At 330, the serving gNB 102Y configures the neighbor gNB 104Y to transmit downlink PRS to the UE 106, and to receive uplink SRS from the UE 106, in network Y. In more detail, for example, the serving gNB 102Y configures and/or assigns, to the neighbor gNB 104Y, uplink SRS sequence, and physical (e.g., time and frequency) resources for the reference signal transmission and reception to and from the UE 106 in network Y.

At 332, the serving gNB 102Y and the neighbor gNB 104Y transmit the downlink PRS to the UE 106 utilizing the configured/assigned resources in network Y.

At 232, the UE 106 sends the uplink SRS transmissions by transmitting the configured uplink SRS sequence on the assigned physical resources (e.g., frequency and time resources) to the serving gNB 102Y and the neighbor gNB 104Y in network Y.

The cross-network positioning request at 310 includes a time for the positioning procedure to occur in network Y such that the uplink SRS transmissions from the UE 106 in network Y occur relatively close in time to the similar uplink SRS transmissions in network X. Accordingly, as with FIGS. 2, 212 and 232 in FIG. 3 may occur at the same or substantially the same time.

At 334, the serving gNB 102Y reports the UL-RTT data to the LMF 100Y in the same or substantially the same manner as discussed above with regard to 314 in FIG. 3, but with regard to network Y. The UL-RTT data may include SRS information (e.g., SRS sequence, transmit and receive time (Tx-Rx time)) for the reference signals from the UE 106.

At 320, the LMF 100Y sends position assistance data for the UE 106 in network Y to the LMF 100X. The position assistance data may include the UL-RTT data for the UE 106 provided at 334, as well as locations of gNBs 102Y and 104Y, in network Y.

At 322, the LMF 100X jointly estimates the position of the UE 106 based on the position assistance data from the LMF 100Y and the UL-RTT data for the UE 106 in network X.

In at least one example embodiment, the LMF 100X utilizes the UL-RTT data (e.g., RTT measurements) from both network X and Y to increase the number of measurements to compute the position of the UE 106 using the UL-RTT computation methodology. Unlike UL-TDOA, in this example embodiment, the time and frequency measurements in the networks need not necessarily be compensated for as each RTT measurement represents the distance from UE to gNB. Nonetheless, the LMF 100X may compensate for error between the measurements if desired and/or warranted.

In more detail, for example, at 322 the LMF 100X may combine the RTT measurements from network X and network Y, and estimate the position of the UE 106 using the combined measurements according to the known UL-RTT methodology, which takes into account the positions of the gNBs 102X, 102Y, 104X and 104Y. In one example, the combination of measurements may be a weighted average.

According to at least one example embodiment, if the UL-RTT data from each of network X and network Y includes RTT measurements from at least three gNBs, then the LMF 100X may estimate the position of the UE 106 in each network separately, and combine the position estimates to generate a joint estimate of the position of the UE 106. In this example, the combination may be an average of the estimated positions of the UE 106 in each network.

Figure 4:
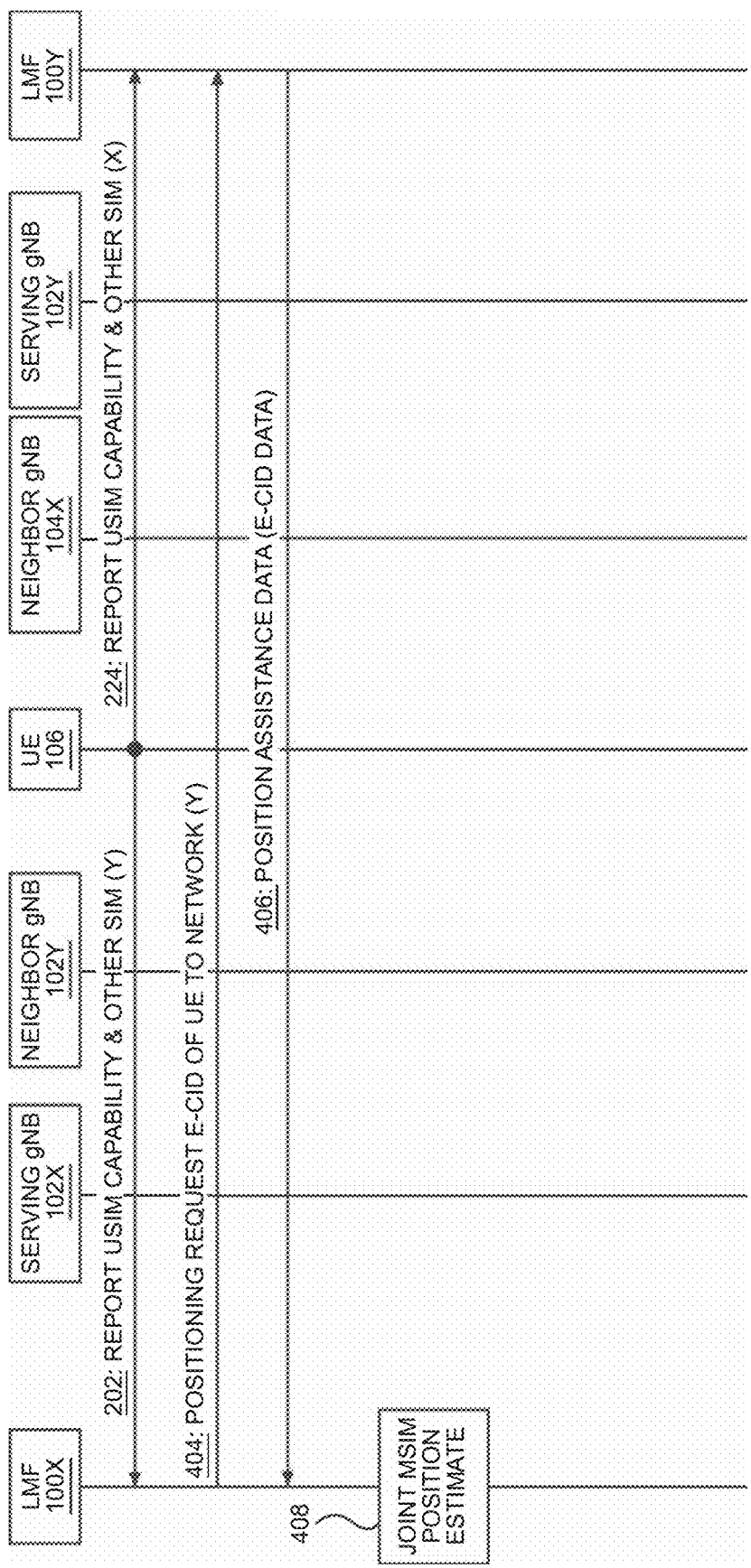
FIG. 4 is a signal flow diagram illustrating another method according to example embodiments.

FIG. 4 is a signal flow diagram illustrating a method for multi-SIM uplink positioning using E-CID according to example embodiments. The example embodiment shown in FIG. 4 will be discussed with regard to the access deployment shown in FIG. 1 for example purposes. However, example embodiments should not be limited to this example.

Referring to FIG. 4, at 202 the UE 106 reports, to LMF 100X, that the UE 106 has multi-USIM capability and is connected to network Y in the same or substantially the same manner as discussed above with regard to FIGS. 2 and 3 (first capability and connection report).

At 224, the UE 106 reports, to LMF 100Y, that the UE 106 has multi-USIM capability and is connected to network X in the same or substantially the same manner as discussed above with regard to FIGS. 2 and 3 (second capability and connection report).

As a result of 202, network X is aware of the UE 106 being connected to network Y, and of the network ID of network Y. As a result of 224, network Y is aware of the UE 106 being connected to network X, and of the network ID of network X.

As with the example embodiments shown in FIGS. 2 and 3, in at least some example embodiments, the LMFs 100X and 100Y may exchange capability information to determine the positioning methods supported by each respective network (e.g., in response to receiving the LPP signaling reporting the network ID of the other network) if this information is not reported by the UE 106 at 202 or 224 in FIG. 4.

At 404, the LMF 100X sends an E-CID positioning request to the LMF 100Y. The E-CID positioning request requests that the LMF Y obtain the E-CID positioning of the UE 106 in network Y, and send the E-CID positioning of the UE 106 in network Y to the LMF 100X. In one example, the LMF 100X may send the E-CID positioning request via an extension of LPP, via IP layer signaling, or the like.

In response to the positioning request from LMF 100X, at 406 the LMF 100Y sends the E-CID positioning for the UE 106 in network Y to the LMF 100X.

At 408, the LMF 100X estimates the position of the UE 106 based on the E-CID positioning at the LMF 100X and the E-CID positioning from the LMF 100Y. According to at least one example embodiment, the LMF 100X may jointly estimate the position of the UE 106 by combining the E-CID position from the LMF 100X and the E-CID position from LMF 100X according to a weighted average. Although a weighted average is discussed herein, example embodiments should not be limited to this example.

Although example embodiments are discussed herein with regard to SRS and PRS, example embodiments should not be limited this example. Rather, example embodiments may utilize any reference signal (RS) used for positioning.

Figure 5:
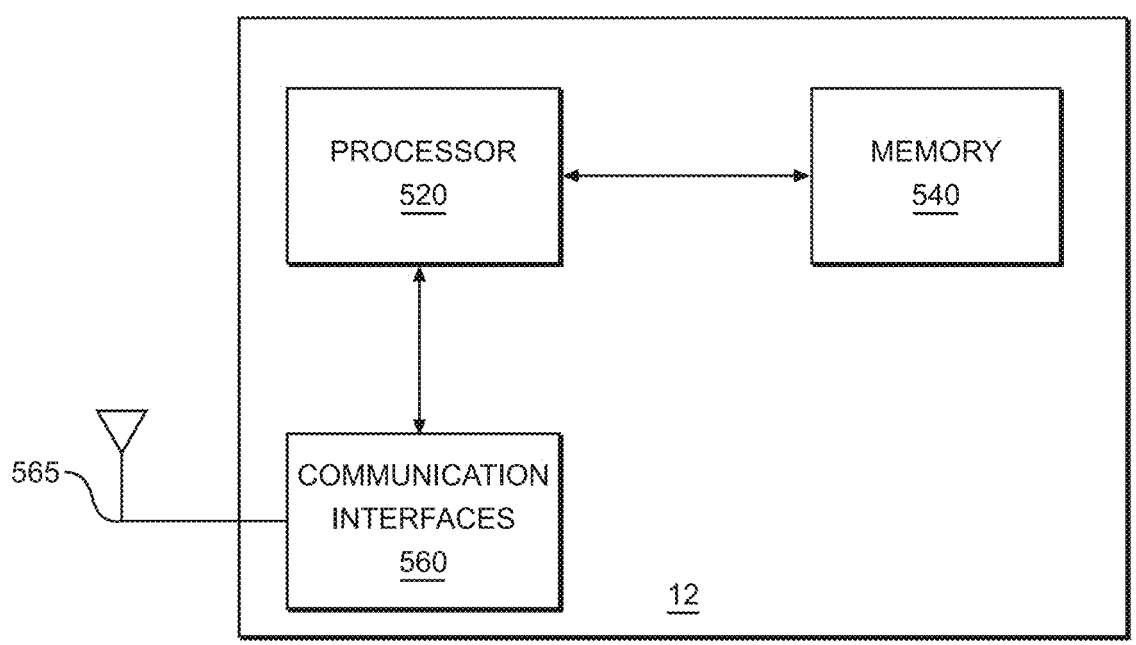
FIG. 5 is a block diagram illustrating an example embodiment of a network element.

FIG. 5 illustrates an example embodiment of network element shown in FIG. 1. The network element may serve as LMF 100X, 100Y, gNBs 102X, 102Y, 104X, 104Y and/or UE 106 shown in FIG. 1. For the sake of brevity, however, FIG. 5 will be described with regard to LMF 100X.

As shown, the network element includes: a memory 540; a processor 520 connected to the memory 540; various interfaces 560 connected to the processor 520; and one or more (e.g., a plurality of) antennas or antenna panels 565 connected to the various interfaces 560. The various interfaces 560 and the antenna 565 may constitute a transceiver for transmitting/receiving data from/to other network elements (e.g., UE 106, gNBs 102X, 102Y, 104X, 104Y, LMF 100Y, etc.) via one or more wireless beams. As will be appreciated, depending on the implementation of the network element, the network element may include many more components than those shown in FIG. 5. However, it is not necessary that all of these generally conventional components be shown in order to disclose the illustrative example embodiment.

The memory 540 may be a computer readable storage medium that generally includes a random access memory (RAM), read only memory (ROM), and/or a permanent mass storage device, such as a disk drive. The memory 540 also stores an operating system and any other routines/modules/applications for providing the functionalities of the network element (e.g., functionalities of a LMF, gNB, UE, methods according to the example embodiments, etc.) to be executed by the processor 520. These software components may also be loaded from a separate computer readable storage medium into the memory 540 using a drive mechanism (not shown). Such separate computer readable storage medium may include a disc, tape, DVD/CD-ROM drive, memory card, or other like computer readable storage medium (not shown). In some example embodiments, software components may be loaded into the memory 540 via one of the various interfaces 560, rather than via a computer readable storage medium.

The processor 520 may be configured to carry out instructions of a computer program by performing the arithmetical, logical, and input/output operations of the system. Instructions may be provided to the processor 520 by the memory 540.

The various interfaces 560 may include components that interface the processor 520 with the antenna 565, or other input/output components. As will be understood, the various interfaces 560 and programs stored in the memory 540 to set forth the special purpose functionalities of the network element will vary depending on the implementation of the network element.

The interfaces 560 may also include one or more user input devices (e.g., a keyboard, a keypad, a mouse, or the like) and user output devices (e.g., a display, a speaker, or the like).

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing user equipment, base stations, eNBs, RRHs, gNBs, femto base stations, network controllers, computers, LMFs, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, user equipment, base stations, eNBs, RRHs, gNBs, femto base stations, network controllers, computers, LMFs, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A network element to estimate a position of a user equipment served by a first network and a second network, the network element comprising:
    at least one processor; and
    at least one memory including computer program code, the at least one memory and the computer program code configured to, with the at least one processor, cause the network element to
        determine first position measurement information for the user equipment in the first network,
        obtain position assistance data associated with the second network, the position assistance data including at least second position measurement information for the user equipment in the second network,
        obtain frequency offset information and time offset information for transmissions in the first network and transmissions in the second network, and
        estimate a position of the user equipment based on the first position measurement information, the second position measurement information, the frequency offset information and the time offset information, wherein at least one of
            the first position measurement information includes first uplink time difference of arrival (UL-TDOA) information or first uplink round trip time (UL-RTT) information, the first UL-TDOA information including a first observed or measured time of arrival for first UL-TDOA transmissions from the user equipment to at least two base stations in the first network, and the first UL-RTT information including a first transmit time for a first RTT downlink transmission from the first network to the user equipment and a first receive time for first RTT uplink transmission from the user equipment to the first network, or
            the second position measurement information includes second uplink time difference of arrival (UL-TDOA) information or second uplink round trip time (UL-RTT) information, the second UL-TDOA information including a second observed or measured time of arrival for second UL-TDOA transmissions from the user equipment to at least two base stations in the second network, and the second UL-RTT information including a second transmit time for a second RTT downlink transmission from the second network to the user equipment and a second receive time for a second RTT uplink transmission from the user equipment to the second network.

2. The network element of claim 1, wherein the network element is a location management function for the first network.

3. The network element of claim 1, wherein
the position assistance data includes a location of at least one base station in the second network, and
the at least one memory and the computer program code are configured to, with the at least one processor, cause the network element to estimate the position of the user equipment based on the first position measurement information, the second position measurement information, the frequency offset information, the time offset information and the location of at least one base station in the second network.

4. The network element of claim 1, wherein the first position measurement information and the second position measurement information include uplink time difference of arrival (UL-TDOA) information or uplink round trip time (UL-RTT) information.

5. The network element of claim 1, wherein the at least one memory and the computer program code are configured to, with the at least one processor, cause the network element to receive a capability and connection report from the user equipment, the capability and connection report including (i) an indication that the user equipment is a multi-Subscriber Identification Module capable user equipment and (ii) a network identifier for the second network.

6. The network element of claim 1, wherein the at least one memory and the computer program code are configured to, with the at least one processor, cause the network element to obtain the position assistance data from a location management function for the second network.

7. The network element of claim 1, wherein the at least one memory and the computer program code are configured to, with the at least one processor, cause the network element to send a cross-network positioning request to a location management function for the second network, the cross-network positioning request requesting that the location management function for the second network configure the user equipment to generate the second position measurement information.

8. The network element of claim 7, wherein the cross-network positioning request includes a time at which to perform a positioning procedure to obtain the second position measurement information.

9. A method for estimating a position of a user equipment served by a first network and a second network, the method comprising:
determining first position measurement information for the user equipment in the first network;
obtaining position assistance data associated with the second network, the position assistance data including at least second position measurement information for the user equipment in the second network;
obtaining frequency offset information and time offset information for transmissions in the first network and transmissions in the second network; and
estimating a position of the user equipment based on the first position measurement information, the second position measurement information, the frequency offset information and the time offset information, wherein at least one of
the first position measurement information includes first uplink time difference of arrival (UL-TDOA) information or first uplink round trip time (UL-RTT) information, the first UL-TDOA information including a first observed or measured time of arrival for first UL-TDOA transmissions from the user equipment to at least two base stations in the first network, and the first UL-RTT information including a first transmit time for a first RTT downlink transmission from the first network to the user equipment and a first receive time for first RTT uplink transmission from the user equipment to the first network, or
the second position measurement information includes second uplink time difference of arrival (UL-TDOA) information or second uplink round trip time (UL-RTT) information, the second UL-TDOA information including a second observed or measured time of arrival for second UL-TDOA transmissions from the user equipment to at least two base stations in the second network, and the second UL-RTT information including a second transmit time for a second RTT downlink transmission from the second network to the user equipment and a second receive time for a second RTT uplink transmission from the user equipment to the second network.

10. The method of claim 9, wherein
the position assistance data includes a location of at least one base station in the second network, and
the estimating estimates the position of the user equipment based on the first position measurement information, the second position measurement information, the frequency offset information, the time offset information and the location of at least one base station in the second network.

11. The method of claim 9, wherein the first position measurement information and the second position measurement information include uplink time difference of arrival (UL-TDOA) information or uplink round trip time (UL-RTT) information.

12. The method of claim 9, further comprising:
receiving a capability and connection report from the user equipment, the capability and connection report including (i) an indication that the user equipment is a multi-Subscriber Identification Module capable user equipment and (ii) a network identifier for the second network.

13. The method of claim 9, further comprising:
obtaining the position assistance data from a location management function for the second network.

14. The method of claim 9, further comprising:
sending a cross-network positioning request to a location management function for the second network, the cross-network positioning request requesting that the location management function for the second network configure the user equipment to generate the second position measurement information.

15. The method of claim 14, wherein the cross-network positioning request includes a time at which to perform a positioning procedure to obtain the second position measurement information.

16. A network element to estimate a position of a user equipment served by a first network and a second network, the network element comprising:
at least one processor; and
at least one memory including computer program code, the at least one memory and the computer program code configured to, with the at least one processor, cause the network element to
generate a first enhanced cell identifier (E-CID) for the user equipment in the first network, the first enhanced cell identifier indicating a position of the user equipment in the first network,
obtain a second enhanced cell identifier for the user equipment in the second network, the second enhanced cell identifier indicating a position of the user equipment in the second network, and estimate a position of the user equipment based on the first enhanced cell identifier and the second enhanced cell identifier.

17. The network element of claim 16, wherein the at least one memory and the computer program code are configured to, with the at least one processor, cause the network element to estimate the position of the user equipment by combining the first enhanced cell identifier and the second enhanced cell identifier.

18. The network element of claim 16, wherein the at least one memory and the computer program code are configured to, with the at least one processor, cause the network element to obtain the second enhanced cell identifier from a location management function for the second network.

19. A user equipment in communication with a first serving base station in a first network and a second serving base station in a second network, the user equipment comprising:

at least one processor; and at least one memory including computer program code, the at least one memory and the computer program code configured to, with the at least one processor, cause the user equipment to send a first capability and connection report to the first network, the first capability and connection report indicating (i) a multi-Subscriber Identification Module (SIM) capability for the user equipment and (ii) a network identifier for the second network, the multi-Subscriber Identification Module capability for the user equipment indicating that the user equipment is configured to be served simultaneously by the first network and the second network, and the network identifier for the second network indicating that the user equipment is connected to the second network, send a second capability and connection report to the second network, the second capability and connection report indicating (i) the multi-Subscriber Identification Module capability for the user equipment and (ii) a network identifier for the first network, the network identifier for the first network indicating that the user equipment is connected to the first network, and report time offset information and frequency offset information to the first network for estimating a position of the user equipment, the time offset information indicative of a time offset between transmissions in the first network and transmissions in the second network, and the frequency offset information indicative of a frequency offset between transmissions in the first network and transmissions in the second network.

20. The user equipment of claim 19, wherein the at least one memory and the computer program code are configured to, with the at least one processor, cause the user equipment to send the first capability and connection report to a first location management function for the first network, and send the second capability and connection report to a second location management function for the second network.

* * * * *